(12) United States Patent
de Wolf et al.

(10) Patent No.: US 10,301,534 B2
(45) Date of Patent: *May 28, 2019

(54) TREATMENT OF ILLITIC FORMATIONS USING A CHELATING AGENT

(75) Inventors: Cornelia Adriana de Wolf, Eerbeek (NL); Mohamed Ahmed Nasr-El-Din Mahmoud, Dhahran (SA); Hisham Nasr-El-Din, College Station, TX (US)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/993,788

(22) PCT Filed: Dec. 14, 2011

(86) PCT No.: PCT/EP2011/072697
§ 371 (c)(1),
(2), (4) Date: Jun. 13, 2013

(87) PCT Pub. No.: WO2012/080298
PCT Pub. Date: Jun. 21, 2012

(65) Prior Publication Data
US 2013/0267446 A1    Oct. 10, 2013

Related U.S. Application Data

(60) Provisional application No. 61/496,145, filed on Jun. 13, 2011, provisional application No. 61/496,111, filed on Jun. 13, 2011, provisional application No. 61/424,182, filed on Dec. 17, 2010, provisional application No. 61/424,271, filed on Dec. 17, 2010, provisional application No. 61/424,329, filed on Dec. 17, 2010.

(30) Foreign Application Priority Data

Jan. 21, 2011  (EP) ..................................... 11151725
Jan. 21, 2011  (EP) ..................................... 11151728
Jan. 21, 2011  (EP) ..................................... 11151729

(51) Int. Cl.
C09K 8/86    (2006.01)
C09K 8/74    (2006.01)
C09K 8/528   (2006.01)
C09K 8/72    (2006.01)

(52) U.S. Cl.
CPC ............... C09K 8/74 (2013.01); C09K 8/528 (2013.01); C09K 8/72 (2013.01); C09K 8/86 (2013.01); C09K 2208/32 (2013.01)

(58) Field of Classification Search
CPC . C09K 8/68; C09K 8/035; C09K 8/60; C09K 8/506; C09K 8/04; C09K 8/86; C09K 8/528; C09K 8/74; C09K 2208/32; C09K 8/72; C09K 8/12; C09K 8/508; C09K 8/52; C09K 8/524; C09K 8/685; C09K 2208/08; C09K 2208/18; C09K 8/10; C09K 8/536; C09K 2208/26; C09K 8/516; C09K 8/03; C09K 8/467

See application file for complete search history.

(56) References Cited

U.S. PATENT DOCUMENTS

| | | | | |
|---|---|---|---|---|
| 4,495,292 | A | * | 1/1985 | Siebert .................. E21B 49/006 175/50 |
| 5,783,524 | A | * | 7/1998 | Greindl .................. C09K 8/528 166/250.05 |
| 8,567,504 | B2 | | 10/2013 | Welton et al. |
| 9,027,647 | B2 | | 5/2015 | Reyes et al. |
| 9,074,120 | B2 | | 7/2015 | Welton |
| 9,120,964 | B2 | | 9/2015 | Reyes et al. |
| 9,127,194 | B2 | | 9/2015 | Reyes |
| 2004/0254079 | A1 | * | 12/2004 | Frenier .................... C09K 8/52 507/260 |
| 2007/0246649 | A1 | | 10/2007 | Jacobi et al. |
| 2007/0281868 | A1 | * | 12/2007 | Pauls ....................... C09K 8/76 507/213 |

(Continued)

FOREIGN PATENT DOCUMENTS

| | | |
|---|---|---|
| JP | H11-012596 A | 1/1999 |
| JP | H11-158498 A | 6/1999 |

(Continued)

OTHER PUBLICATIONS

J.N. LePage, C.A. DeWolf, J.H. Bemelaar, H.A. Nasr-El-Din, An environmentally friendly stimulation fluid for high temperature applications, SPE International symposium on oilfield chemistry, The Woodland, Texas, USA, Apr. 20-22, 2009.*

M.A. Mahmoud et al. SPE132286—Stimulation of Carbonate Reservoirs Using GLDA (Chelating Agent) Solutions, presented at 2010 SPE Trinidad & Tobago Energy/Res. Conf Jun. 27-30.

M.A. Mahmoud et al. SPE133497—Optimum Injection Rate of a New Chelate That Can Be Used to Stimulate Carbonate Reservoirs, presented Florence, IT, Sep. 20-22, 2010.

D.E. Simon et al. SPE19422—Stability of Clay Minerals in Acid, pres. SPE Formation Damage Control Symp., Lafayette, LA Feb. 22-23, 1990.

W. Frenier et al. SPE86522—Hot Oil and Gas Wells Can Be Stimulated Without Acids, pres. SPE Int'l Symp. Exh. on Formation Damage Control, Lafayette, LA Feb. 18-20, 2004.

(Continued)

*Primary Examiner* — Kumar R Bhushan
(74) *Attorney, Agent, or Firm* — Sandra B. Weiss

(57) ABSTRACT

The present invention relates to a process for treating a sandstone formation comprising introducing a fluid containing glutamic acid N,N-diacetic acid or a salt thereof (GLDA) and/or methylglycine N,N-diacetic acid or a salt thereof (MGDA) and having a pH of between 1 and 14 into the formation. The invention in addition relates to a fluid suitable for use in the above process containing 5-30 wt % of glutamic acid N,N-diacetic acid or a salt thereof (GLDA) and/or methylglycine N,N-diacetic acid or a salt thereof (MGDA), a corrosion inhibitor, a surfactant, and a mutual solvent.

15 Claims, 6 Drawing Sheets

(56) References Cited

U.S. PATENT DOCUMENTS

| | | | |
|---|---|---|---|
| 2008/0035340 A1* | 2/2008 | Welton | C09K 8/035 |
| | | | 166/279 |
| 2008/0200354 A1* | 8/2008 | Jones | C09K 8/524 |
| | | | 507/244 |
| 2008/0277112 A1 | 11/2008 | Welton et al. | |
| 2009/0246671 A1 | 10/2009 | Suzuki | |
| 2009/0291863 A1 | 11/2009 | Welton et al. | |
| 2011/0259592 A1* | 10/2011 | Reyes | 166/305.1 |
| 2012/0145401 A1* | 6/2012 | Reyes | C09K 8/78 |
| | | | 166/305.1 |
| 2013/0210684 A1* | 8/2013 | Ballard | C09K 8/52 |
| | | | 507/201 |
| 2013/0213659 A1* | 8/2013 | Luyster | C09K 8/528 |
| | | | 166/312 |
| 2013/0274154 A1 | 10/2013 | Nasr-El-Din et al. | |
| 2013/0281329 A1 | 10/2013 | De Wolf et al. | |

FOREIGN PATENT DOCUMENTS

| | | | |
|---|---|---|---|
| JP | 2000-234286 A | | 8/2000 |
| JP | 2001-003089 A | | 1/2001 |
| JP | 2008-174724 A | | 7/2008 |
| JP | 2009-091469 A | | 4/2009 |
| JP | 2009-515022 A | | 4/2009 |
| JP | 2009-522420 A | | 6/2009 |
| JP | 2010-082600 A | | 4/2010 |
| RU | 2 100 587 C1 | | 12/1997 |
| WO | WO 2004/094557 A1 | | 11/2004 |
| WO | 2005/028592 A1 | | 3/2005 |
| WO | 2005/103334 A1 | | 11/2005 |
| WO | WO 2006/054261 A2 | | 5/2006 |
| WO | 2007/026528 A1 | | 3/2007 |
| WO | 2007/052004 A1 | | 5/2007 |
| WO | 2007/104054 A1 | | 9/2007 |
| WO | 2008/015464 A1 | | 2/2008 |
| WO | WO 2008/15464 | * | 2/2008 |
| WO | WO 2008/015464 | * | 2/2008 |
| WO | WO 2008/089262 A1 | | 7/2008 |
| WO | WO 2008/096165 A1 | | 8/2008 |
| WO | WO 2008/139164 A1 | | 11/2008 |
| WO | WO 2009/006326 | * | 1/2009 |
| WO | WO 2009/006326 A2 | | 1/2009 |
| WO | WO 2009/022106 A1 | | 2/2009 |
| WO | WO 2009/022107 A1 | | 2/2009 |
| WO | WO 2009/024518 | * | 2/2009 |
| WO | WO 2009/024518 A1 | | 2/2009 |
| WO | 2009/091652 A2 | | 7/2009 |
| WO | WO 2009/086954 | * | 7/2009 |
| WO | WO 2009/086954 A1 | | 7/2009 |
| WO | WO 2009/137399 | * | 11/2009 |
| WO | WO 2009/137399 A2 | | 11/2009 |
| WO | 2010/053904 A2 | | 5/2010 |
| WO | 2010/056779 A2 | | 5/2010 |
| WO | WO 2010/107721 | * | 9/2010 |
| WO | WO 2010/107721 A2 | | 9/2010 |

OTHER PUBLICATIONS

J.O. Amaelule et al., Advances in Formation Damage Assessment and Control Strategies, presented Jun. 12-16, 1998 at 39th Ann. Tech. Mtg. of the Petroleum Soc. of CIM, Calgary.

European Search Report dated May 27, 2011 for App. No. 11151729. 8.

International Search Report dated Apr. 2, 2012 for App. No. PCT/EP2011/072697.

J.N. Lepage et al., SPE121709—An Environmentally Friendly Stimulation Fluid for High-Temperature Applications, presented The Woodlands, TX, USA Apr. 20-22, 2009.

M.A. Mahmoud et al. SPE127923—Evaluation of a New Environmentally Friendly Chelating Agent for High-Temperature Applications, presented Lafayette, LA Feb. 10-12, 2010.

M.A. Mahhmoud et al. SPE131626—An Effective Stimulation Fluid for Deep Carbonate Reservoirs: A Core Flood Study, presented Beijing, CN, Jun. 8-10, 2010.

R.L. Thomas et al. SPE71690—Precipitation During the Acidizing of a HT/HP . . . A Laboratory Study, presented at New Orleans, LA, US Sep. 30-Oct. 3, 2001.

H.A. Nasr-El-Din et al. SPE107636—Investigation of a Single-Stage Sandstone Acidizing Fluid for High Temperature Formations, presented Scheveningen, NL May 30-Jun. 1, 2007.

Office Action dated Jul. 3, 2014 issued in Colombian Application No. 13-163620 and English translation of same (17 pages).

Leonard Kalfayan, Production Enhancement with Acid Stimulation, Penwell Corporation, 2nd Edition 2008 (53 Pages), (as cited in Office Action dated Jul. 3, 2014 issued in Colombian Application No. 13-163620, on p. 3, under 6. State of the Art Determination).

Nami et al., "Chemical Stimulation Operations for Reservoir Development of the Deep Crystalline HDR/EGS System at Soultz-Sous-Forets (France)," Proceedings, Thirty-Second Workshop on Geothermal Reservoir Engineering, Stanford University, Jan. 28-30, 2008 (11 Pages).

Salah Al-Harthy et al., Options for High Temperature Well Stimulation, Oilfield Review, Winter 2008/2009: 20, No. 4, pp. 52-62.

R.D. Gdanski et al., SPE 52397, "Advanced Sandstone-Acidizing Designs with Improved Radical Models," SPE Production & Facilities, pp. 272-278, Nov. 1998.

M. Parkinson et al., SPE 128043, "Stimulation of Multilayered High-Carbonate-Content Sandstone Formations in W. Africa Using Chelant-Based Fluids and Mechanical Diversion," prepared for presentation at the 2010 SPE International Symposium and Exhibition on Formation Damage Control Feb. 10-12, 2010.

* cited by examiner

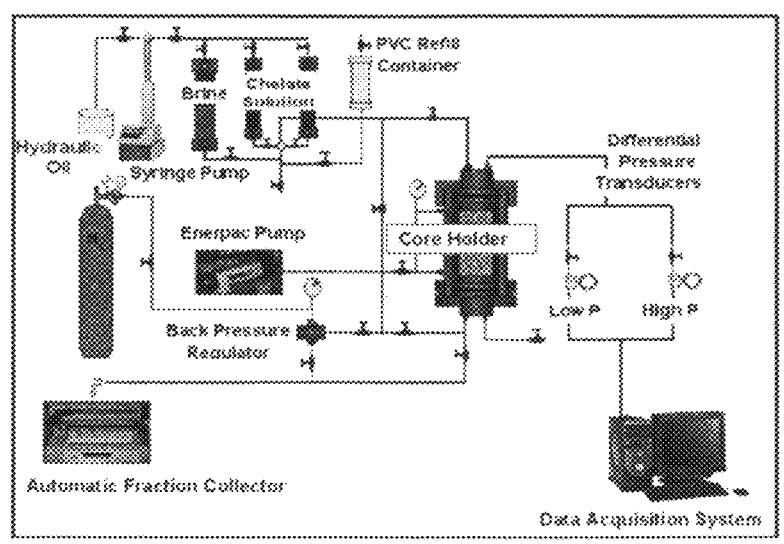
Fig. 1 - Core flooding set-up.

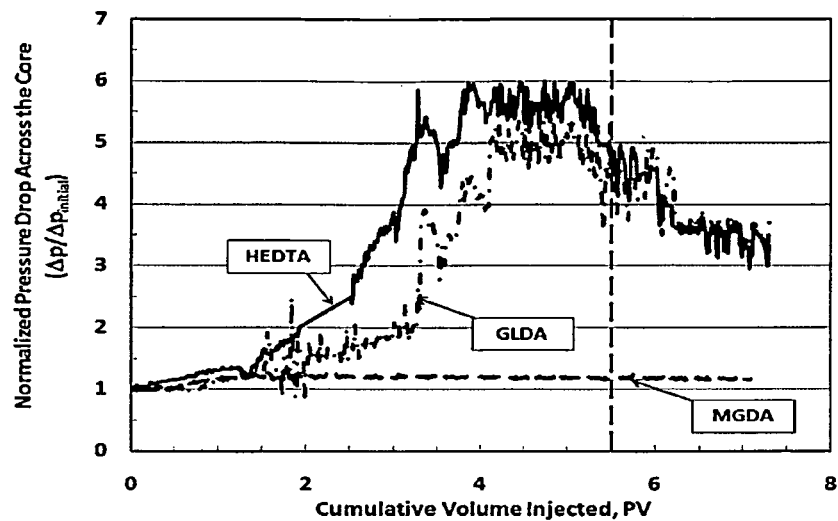
Fig. 2 - Pressure drop across the core during the coreflood experiment for 0.6M GLDA (pH = 4) and 0.6M HEDTA (pH = 4) at 300°F and 5 cm$^3$/min using Berea sandstone cores.

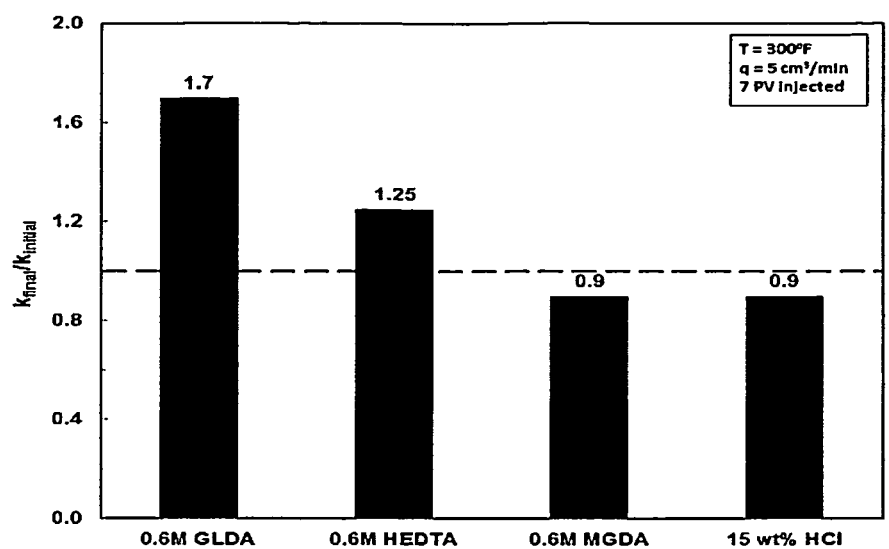
Fig. 3 - Permeability ratio for the Berea sandstone cores treated with 15 wt% HCl and 0.6M chelating agent (pH =4) at 300°F and 5 cm³/min.

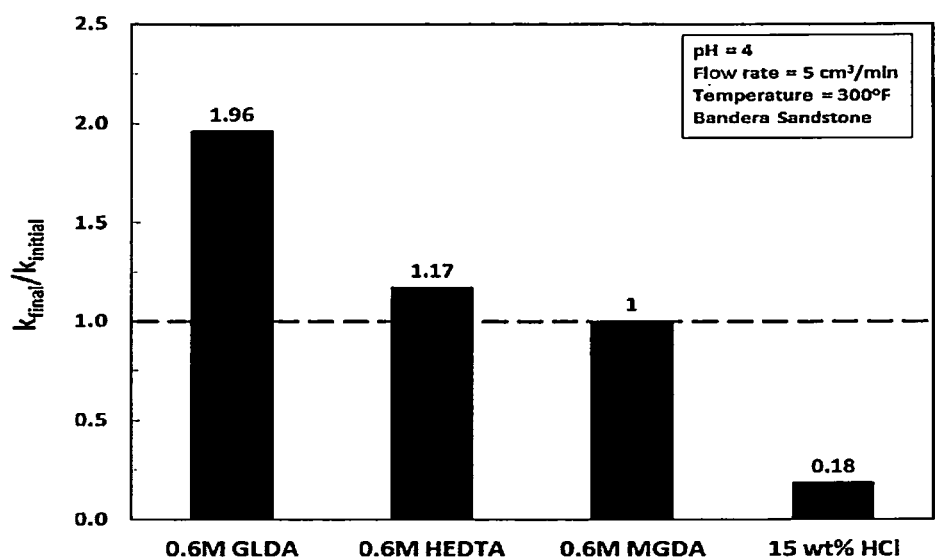
Fig. 4 - Permeability ratio for the Bandera sandstone cores treated with 15 wt% HCl and 0.6M chelate (pH =4) at 300°F and 5 cm³/min.

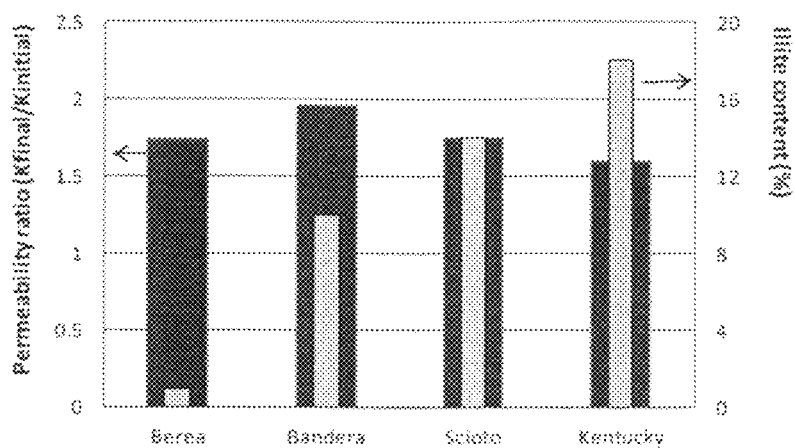
Fig. 5 - Permeability ratio (left axis) for various sandstone cores treated with 0.6M GLDA (pH =4) at 300°F and 5 cm³/min. The illite content of the sandstones is indicated on the right axis.

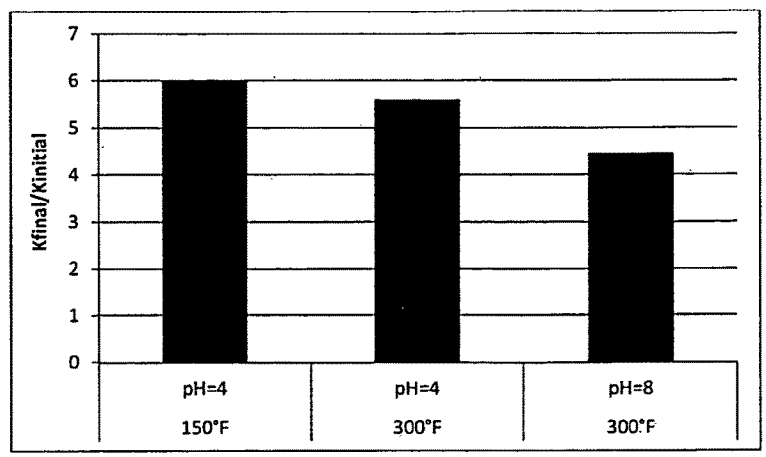
Fig. 6 - Permeability ratio after core flooding tests with 0.6 M GLDA with an injection rate of 5 cm³/min on Bandera sandstone under different temperature and pH conditions

TREATMENT OF ILLITIC FORMATIONS USING A CHELATING AGENT

This application is the U.S. National Phase of PCT/EP2011/072697 filed on Dec. 14, 2011 and claims the benefit of U.S. Provisional Application No. 61/424,329 filed on Dec. 17, 2010, U.S. Provisional Application No. 61/424,182 filed on Dec. 17, 2010, U.S. Provisional Application No. 61/424,271 filed on Dec. 17, 2010, European Application No. 11151729.8 filed on Jan. 21, 2011, European Application No. 11151725.6 filed on Jan. 21, 2011, European Application No. 11151728.0 filed on Jan. 21, 2011, U.S. Provisional Application No. 61/496,111 filed on Jun. 13, 2011 and U.S. Provisional Application No. 61/496,145 filed on Jun. 13, 2011, the entire contents of each of which are incorporated herein by reference.

The present invention relates to a process for treating illite-containing formations, preferably sandstone formations, with a fluid that contains glutamic acid N,N-diacetic acid or a salt thereof (GLDA).

Subterranean formations from which oil and/or gas can be recovered can contain several solid materials contained in porous or fractured rock formations. The naturally occurring hydrocarbons, such as oil and/or gas, are trapped by the overlying rock formations with lower permeability. The reservoirs are found using hydrocarbon exploration methods and often one of the purposes of withdrawing the oil and/or gas therefrom is to improve the permeability of the formations. The rock formations can be distinguished by their major components and one category is formed by the so-called sandstone formations, which contain siliceous materials (like quartz) as the major constituent, and another category is formed by the so-called carbonate formations, which contain carbonates (like calcite and dolomite) as the major constituent.

One process to make formations more permeable is a matrix acidizing process, wherein an acidic fluid is introduced into the formations trapping the oil and/or gas. However, the state of the art acidizing process wherein an aqueous HCl is introduced into a sandstone formation leads to problems when the formation contains illite. For example, D. E. Simon and M. S. Anderson in "Stability of Clay Minerals in Acid," published as SPE 19422 and presented at the Formation Damage Control Symposium, Feb. 22-23, 1990, disclose that HCl affects the structure of clay minerals commonly found in sandstone.

Rock-fluid interactions in sedimentary formations can be classified in two groups: (1) chemical reactions resulting from the contact of rock minerals with incompatible fluids and (2) physical processes caused by excessive flow rates and pressure gradients. Illites are interlayered, therefore, illites combine the worst characteristics of the dispersible and the swellable clays.

Amaerule, J. O., Kersey, D. G., Norman, D. L., and Shannon, P. M. (1988), "Advances in Formation Damage Assessment and Control Strategies," CIM Paper No. 88-39-65, Proceedings of the 39$^{th}$ Annual Technical Meeting of Petroleum Society of CIM and Canadian Gas Processors Association, Calgary, Alberta, June 12-16, 1988, DOI: 10.2118/88-39-65, and Thomas, R. L., Nasr-El-Din, H. A., Lynn, J. D., Mehta, S., and Zaidi, S. R. (2001), "Precipitation During the Acidizing of a HT/HP Illitic Sandstone Reservoir in Eastern Saudi Arabia: A Laboratory Study," Paper SPE 71690 presented at the SPE Annual Technical Conference and Exhibition, New Orleans, La., 30 Sept.-3 Oct. 2001, DOI: 10. 2118/71690-MS, disclose that illite- and chlorite-containing formations are water-sensitive. These clay minerals can swell rapidly when contacted with fluids with a different salinity, by incorporating water into their crystal structure. Such swellable clays can cause plugging of the formation. In addition, illite is very susceptible to fines migration due to its very large surface area to volume ratio and its loose attachment to the pore walls. Fines migration results from mechanical dislodgement caused by the drag forces exerted on the particles by gas or fluid flowing through the pores. The latter paper also discloses that illite and chlorite are very sensitive to HCl above 150° F. When contacted with HCl the aluminum layer of these clays is extracted, leaving an amorphous silica gel residue that can potentially damage the formation Frenier W, et al. in "Hot Oil and Gas Wells Can Be Stimulated Without Acids" presented at the 2004 SPE International Symposium and Exhibition on Formation Damage Control, Lafayette, La., 18-20 Feb. 2004 and published as SPE 86522, disclose that wells can be stimulated using HEDTA instead of an inorganic acid like HCl or HF. The advantages of HEDTA are said to be its high solubility at pH<5, low toxicity, and low corrosion rate. The solutions are said to be of good use in carbonate and sandstone formations at a temperature of up to 365° F. Illitic formations, like illitic sandstone, are also mentioned.

The present invention aims to provide a process in which many of the above attendant disadvantages of the degradation products of illite caused by treating them with HCl are avoided and which represents a further improvement compared to the process wherein HEDTA is used.

DESCRIPTION OF THE FIGURES

FIG. 1 is a schematic diagram of the core flooding apparatus used in the Examples herein.

FIG. 2 is a graph showing the normalized pressure drop across the core for three test solutions evaluated with Berea sandstone cores in accordance with Example 1.

FIG. 3 is a chart showing the permeability ratio achieved with four test solutions evaluated with Berea sandstone cores, in accordance with Example 1.

FIG. 4 is a chart showing the permeability ratio achieved with four test solutions evaluated with Bandera sandstone cores, in accordance with Example 2.

FIG. 5 is a chart showing the permeability ratio achieved with 0.6M GLDA at pH 4 in different sandstone cores with increasing illite content, in accordance with Example 3.

FIG. 6 is a chart showing the permeability ratio achieved with test solutions evaluated with Bandera sandstone cores, in accordance with Example 4.

It has been found that when using a fluid for the matrix acidizing step in which GLDA is used, the above disadvantages are avoided to a great extent and further improvements in achieving permeability were found.

Accordingly, the present invention provides a process for treating an illite-containing formation comprising introducing a fluid containing glutamic acid N,N-diacetic acid or a salt thereof (GLDA) into the formation. In addition, the present invention provides a fluid containing glutamic acid N,N-diacetic acid or a salt thereof (GLDA), a corrosion inhibitor, and a surfactant, which fluid can be used in the above process.

The illite-containing formation in one embodiment can be an illite-containing carbonate formation or an illite-containing sandstone formation and in a preferred embodiment is an illite-containing sandstone formation.

In one embodiment the amount of illite in the formation is between 0.5 wt % and 50 wt % on the basis of the total weight of the formation, preferably between 1 wt % and 30 wt %.

The term treating in this application is intended to cover any treatment of the formation with the fluid. It specifically covers treating the formation with the fluid to achieve at least one of (i) an increased permeability, (ii) the removal of small particles, and (iii) the removal of inorganic scale, and so enhance the well performance and enable an increased production of oil and/or gas from the formation. At the same time it may cover cleaning of the wellbore and descaling of the oil/gas production well and production equipment.

Surprisingly, it was found that GLDA does not degrade the illite in the formation to give many small particles, as is the case with acidic treatment fluids that are based on HCl. GLDA acts much more selectively on the calcium carbonate in the formation and dissolves this carbonate material, leaving the illite quite unaffected. Therefore, when using the process of the invention, the disadvantages caused by many fines, which are primarily to do with fines migration causing particles suspended in the produced fluid to bridge the pore throats near the wellbore, and so reducing well productivity, can be largely avoided. Damage created by fines usually is located within a radius of 3 to 5 ft [1 to 2 m] of the wellbore, but can also occur in gravel-pack completions. In addition, the process of the invention provides an improved permeability of the formation.

The GLDA is preferably used in an amount of between 5 and 30 wt %, more preferably between 10 and 30 wt %, even more preferably between 10 and 20 wt %, on the basis of the total weight of the fluid.

The process of the invention is preferably performed at a temperature of between 35 and 400° F. (about 2 and 204° C.), more preferably between 77 and 400° F. (about 25 and 204° C.). Even more preferably, the fluids are used at a temperature where they best achieve the desired effects, which means a temperature of between 77 and 300° F. (about 25 and 149° C.), most preferably between 150 and 300° F. (about 65 and 149° C.).

The process of the invention is preferably performed at a pressure between atmospheric pressure and fracture pressure, wherein fracture pressure is defined as the pressure above which injection of fluids will cause the formation to fracture hydraulically.

Salts of GLDA that can be used are its alkali metal, alkaline earth metal, or ammonium full and partial salts. Also mixed salts containing different cations can be used. Preferably, the sodium, potassium, and ammonium full or partial salts of GLDA are used.

The fluids of the invention are preferably aqueous fluids, i.e. they preferably contain water as a solvent for the other ingredients, wherein water can be e.g. fresh water, produced water or seawater, though other solvents may be added as well, as further explained below.

In an embodiment, the pH of the fluids of the invention and as used in the process can range from 1.7 to 14. Preferably, however, it is between 3.5 and 13, as in the very acidic ranges of 1.7 to 3.5 and the very alkaline range of 13 to 14 some undesired side effects may be caused by the fluids in the formation, such as too fast dissolution of carbonate giving excessive $CO_2$ formation or an increased risk of reprecipitation. For a better carbonate dissolving capacity it is preferably acidic. On the other hand, it must be realized that highly acidic solutions are more expensive to prepare. Consequently, the solution even more preferably has a pH of 3.5 to 8.

The fluid may contain other additives that improve the functionality of the stimulation action and minimize the risk of damage as a consequence of the said treatment, as is known to anyone skilled in the art.

The fluid of the invention may in addition contain one or more of the group of anti-sludge agents, (water-wetting or emulsifying) surfactants, corrosion inhibitors, mutual solvents, corrosion inhibitor intensifiers, foaming agents, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives such as further acids and/or bases, bactericides/biocides, particulates, crosslinkers, salt substitutes (such as tetramethyl ammonium chloride), relative permeability modifiers, sulfide scavengers, fibres, nanoparticles, consolidating agents (such as resins and/or tackifiers), combinations thereof, or the like.

The mutual solvent is a chemical additive that is soluble in oil, water, acids (often HCl based), and other well treatment fluids. Mutual solvents are routinely used in a range of applications, controlling the wettability of contact surfaces before, during and/or after a treatment, and preventing or breaking emulsions. Mutual solvents are used, as insoluble formation fines pick up organic film from crude oil. These particles are partially oil-wet and partially water-wet. This causes them to collect materials at any oil-water interface, which can stabilize various oil-water emulsions. Mutual solvents remove organic films leaving them water wet, thus emulsions and particle plugging are eliminated. If a mutual solvent is employed, it is preferably selected from the group which includes, but is not limited to, lower alcohols such as methanol, ethanol, 1-propanol, 2-propanol, and the like, glycols such as ethylene glycol, propylene glycol, diethylene glycol, dipropylene glycol, polyethylene glycol, polypropylene glycol, polyethylene glycol-polyethylene glycol block copolymers, and the like, and glycol ethers such as 2-methoxyethanol, diethylene glycol monomethyl ether, and the like, substantially water/oil-soluble esters, such as one or more C2-esters through C10-esters, and substantially water/oil-soluble ketones, such as one or more C2-C10 ketones, wherein substantially soluble means soluble in more than 1 gram per liter, preferably more than 10 grams per liter, even more preferably more than 100 grams per liter, most preferably more than 200 grams per liter. The mutual solvent is preferably present in an amount of 1 to 50 wt % on total fluid.

A preferred water/oil-soluble ketone is methyl ethyl ketone.

A preferred substantially water/oil-soluble alcohol is methanol.

A preferred substantially water/oil-soluble ester is methyl acetate.

A more preferred mutual solvent is ethylene glycol monobutyl ether, generally known as EGMBE The amount of glycol solvent in the fluid is preferably about 1 wt % to about 10 wt %, more preferably between 3 and 5 wt %. More preferably, the ketone solvent may be present in an amount from 40 wt % to about 50 wt %; the substantially water-soluble alcohol may be present in an amount within the range of about 20 wt % to about 30 wt %; and the substantially water/oil-soluble ester may be present in an amount within the range of about 20 wt % to about 30 wt %, each amount being based upon the total weight of the solvent in the fluid.

The surfactant can be any surfactant known in the art and can be nonionic, cationic, anionic, zwitterionic. Preferably, the surfactant is nonionic or anionic for illitic sandstone formations. Even more preferably, the surfactant is anionic when the illitic formation is a sandstone formation. When the illitic formation is a carbonate formation, the surfactant is preferably nonionic or cationic, even more preferably cationic.

The nonionic surfactant of the present composition is preferably selected from the group consisting of alkanolamides, alkoxylated alcohols, alkoxylated amines, amine oxides, alkoxylated amides, alkoxylated fatty acids, alkoxylated fatty amines, alkoxylated alkyl amines (e.g., cocoalkyl amine ethoxylate), alkyl phenyl polyethoxylates, lecithin, hydroxylated lecithin, fatty acid esters, glycerol esters and their ethoxylates, glycol esters and their ethoxylates, esters of propylene glycol, sorbitan, ethoxylated sorbitan, polyglycosides and the like, and mixtures thereof. Alkoxylated alcohols, preferably ethoxylated alcohols, optionally in combination with (alkyl)polyglycosides, are the most preferred nonionic surfactants.

The anionic (sometimes zwitterionic, as two charges are combined into one compound) surfactants may comprise any number of different compounds, including sulfonates, hydrolyzed keratin, sulfosuccinates, taurates, betaines, modified betaines, alkylamidobetaines (e.g., cocoamidopropyl betaine).

The cationic surfactants may comprise quaternary ammonium compounds (e.g., trimethyl tallow ammonium chloride, trimethyl coco ammonium chloride), derivatives thereof, and combinations thereof.

Examples of surfactants that are also foaming agents that may be utilized to foam and stabilize the treatment fluids of this invention include, but are not limited to, betaines, amine oxides, methyl ester sulfonates, alkylamidobetaines such as cocoamidopropyl betaine, alpha-olefin sulfonate, trimethyl tallow ammonium chloride, C8 to C22 alkyl ethoxylate sulfate, and trimethyl coco ammonium chloride.

Suitable surfactants may be used in a liquid or powder form.

Where used, the surfactants may be present in the fluid in an amount sufficient to prevent incompatibility with formation fluids, other treatment fluids, or wellbore fluids at reservoir temperature.

In an embodiment where liquid surfactants are used, the surfactants are generally present in an amount in the range of from about 0.01% to about 5.0% by volume of the fluid.

In one embodiment, the liquid surfactants are present in an amount in the range of from about 0.1% to about 2.0% by volume of the fluid, more preferably between 0.1 and 1 volume %.

In embodiments where powdered surfactants are used, the surfactants may be present in an amount in the range of from about 0.001% to about 0.5% by weight of the fluid.

The antisludge agent can be chosen from the group of mineral and/or organic acids used to stimulate sandstone hydrocarbon bearing formations. The function of the acid is to dissolve acid-soluble materials so as to clean or enlarge the flow channels of the formation leading to the wellbore, allowing more oil and/or gas to flow to the wellbore.

Problems are caused by the interaction of the (usually concentrated, 20-28%) stimulation acid and certain crude oils (e.g. aphaltic oils) in the formation to form sludge. Interaction studies between sludging crude oils and the introduced acid show that permanent rigid solids are formed at the acid-oil interface when the aqueous phase is below a pH of about 4. No films are observed for non-sludging crudes with acid.

These sludges are usually reaction products formed between the acid and the high molecular weight hydrocarbons such as asphaltenes, resins, etc.

Methods for preventing or controlling sludge formation with its attendant flow problems during the acidization of crude-containing formations include adding "anti-sludge" agents to prevent or reduce the rate of formation of crude oil sludge, which anti-sludge agents stabilize the acid-oil emulsion and include alkyl phenols, fatty acids, and anionic surfactants. Frequently used as the surfactant is a blend of a sulfonic acid derivative and a dispersing surfactant in a solvent. Such a blend generally has dodecyl benzene sulfonic acid (DDBSA) or a salt thereof as the major dispersant, i.e. anti-sludge, component.

The carrier fluids are aqueous solutions which in certain embodiments contain a Bronsted acid to keep the pH in the desired range and/or contain an inorganic salt, preferably NaCl or KCl.

Corrosion inhibitors may be selected from the group of amine and quaternary ammonium compounds and sulfur compounds. Examples are diethyl thiourea (DETU), which is suitable up to 185° F. (about 85° C.), alkyl pyridinium or quinolinium salt, such as dodecyl pyridinium bromide (DDPB), and sulfur compounds, such as thiourea or ammonium thiocyanate, which are suitable for the range 203-302° F. (about 95-150° C.), benzotriazole (BZT), benzimidazole (BZI), dibutyl thiourea, a proprietary inhibitor called TIA, and alkyl pyridines.

In general, the most successful inhibitor formulations for organic acids and chelating agents contain amines, reduced sulfur compounds or combinations of a nitrogen compound (amines, quats or polyfunctional compounds) and a sulfur compound. The amount of corrosion inhibitor is preferably between 0.1 and 2 volume %, more preferably between 0.1 and 1 volume % on total fluid.

One or more corrosion inhibitor intensifiers may be added, such as for example formic acid, potassium iodide, antimony chloride, or copper iodide.

One or more salts may be used as rheology modifiers to modify the rheological properties (e.g., viscosity and elastic properties) of the treatment fluids. These salts may be organic or inorganic.

Examples of suitable organic salts include, but are not limited to, aromatic sulfonates and carboxylates (such as p-toluene sulfonate and naphthalene sulfonate), hydroxynaphthalene carboxylates, salicylate, phthalate, chlorobenzoic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethyl ammonium hydrochloride and tetramethyl ammonium chloride.

Examples of suitable inorganic salts include water-soluble potassium, sodium, and ammonium halide salts (such as potassium chloride and ammonium chloride), calcium chloride, calcium bromide, magnesium chloride, sodium formate, potassium formate, cesium formate, and zinc halide salts. A mixture of salts may also be used, but it should be noted that preferably chloride salts are mixed with chloride salts, bromide salts with bromide salts, and formate salts with formate salts.

Wetting agents that may be suitable for use in this invention include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art.

The foaming gas may be air, nitrogen or carbon dioxide. Nitrogen is preferred.

Gelling agents in a preferred embodiment are polymeric gelling agents.

Examples of commonly used polymeric gelling agents include, but are not limited to, biopolymers, polysaccharides such as guar gums and derivatives thereof, cellulose derivatives, synthetic polymers like polyacrylamides and viscoelastic surfactants, and the like. These gelling agents, when hydrated and at a sufficient concentration, are capable of forming a viscous solution.

When used to make an aqueous-based treatment fluid, a gelling agent is combined with an aqueous fluid and the soluble portions of the gelling agent are dissolved in the aqueous fluid, thereby increasing the viscosity of the fluid.

Viscosifiers may include natural polymers and derivatives such as xantham gum and hydroxyethyl cellulose (HEC) or synthetic polymers and oligomers such as poly(ethylene glycol) [PEG], poly(diallyl amine), poly(acrylamide), poly (aminomethyl propyl sulfonate) [AMPS polymer], poly (acrylonitrile), poly(vinyl acetate), poly(vinyl alcohol), poly (vinyl amine), poly(vinyl sulfonate), poly(styryl sulfonate), poly(acrylate), poly(methyl acrylate), poly(methacrylate), poly(methyl methacrylate), poly(vinyl pyrrolidone), poly (vinyl lactam) and co-, ter-, and quater-polymers of the following (co-)monomers: ethylene, butadiene, isoprene, styrene, divinyl benzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinyl pyrrolidone, and vinyl lactam. Yet other viscosifiers include clay-based viscosifiers, especially laponite and other small fibrous clays such as the polygorskites (attapulgite and sepiolite). When using polymer-containing viscosifiers, the viscosifiers may be used in an amount of up to 5% by weight of the fluid.

Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, sodium sulfate, potassium nitrate, and the like. A mixture of salts may also be used in the brines, but it should be noted that preferably chloride salts are mixed with chloride salts, bromide salts with bromide salts, and formate salts with formate salts.

The brine chosen should be compatible with the formation and should have a sufficient density to provide the appropriate degree of well control.

Additional salts may be added to a water source, e.g., to provide a brine, and a resulting treatment fluid, in order to have a desired density.

The amount of salt to be added should be the amount necessary for formation compatibility, such as the amount necessary for the stability of clay minerals, taking into consideration the crystallization temperature of the brine, e.g., the temperature at which the salt precipitates from the brine as the temperature drops.

Preferred suitable brines may include seawater and/or formation brines.

Salts may optionally be included in the fluids of the present invention for many purposes, including for reasons related to compatibility of the fluid with the formation and the formation fluids.

To determine whether a salt may be beneficially used for compatibility purposes, a compatibility test may be performed to identify potential compatibility problems.

From such tests, one of ordinary skill in the art will, with the benefit of this disclosure, be able to determine whether a salt should be included in a treatment fluid of the present invention.

Suitable salts include, but are not limited to, calcium chloride, sodium chloride, magnesium chloride, potassium chloride, sodium bromide, potassium bromide, ammonium chloride, sodium formate, potassium formate, cesium formate, and the like. A mixture of salts may also be used, but it should be noted that preferably chloride salts are mixed with chloride salts, bromide salts with bromide salts, and formate salts with formate salts.

The amount of salt to be added should be the amount necessary for the required density for formation compatibility, such as the amount necessary for the stability of clay minerals, taking into consideration the crystallization temperature of the brine, e.g., the temperature at which the salt precipitates from the brine as the temperature drops.

Salt may also be included to increase the viscosity of the fluid and stabilize it, particularly at temperatures above 180° F. (about 82° C.).

Examples of suitable pH control additives which may optionally be included in the treatment fluids of the present invention are acid compositions and/or bases.

A pH control additive may be necessary to maintain the pH of the treatment fluid at a desired level, e.g., to improve the effectiveness of certain breakers and to reduce corrosion on any metal present in the wellbore or formation, etc.

One of ordinary skill in the art will, with the benefit of this disclosure, be able to recognize a suitable pH for a particular application.

In one embodiment, the pH control additive may be an acid composition.

Examples of suitable acid compositions may comprise an acid, an acid-generating compound, and combinations thereof.

Any known acid may be suitable for use with the treatment fluids of the present invention.

Examples of acids that may be suitable for use in the present invention include, but are not limited to, organic acids (e.g., formic acids, acetic acids, carbonic acids, citric acids, glycolic acids, lactic acids, ethylene diamine tetraacetic acid ("EDTA"), hydroxyethyl ethylene diamine triacetic acid ("HEDTA"), and the like), inorganic acids (e.g., hydrochloric acid, hydrofluoric acid, phosphonic acid, p-toluene sulfonic acid, and the like), and combinations thereof. Preferred acids are HCl (in an amount compatible with the illite content) and organic acids.

Examples of acid-generating compounds that may be suitable for use in the present invention include, but are not limited to, esters, aliphatic polyesters, ortho esters, which may also be known as ortho ethers, poly(ortho esters), which may also be known as poly(ortho ethers), poly(lactides), poly(glycolides), poly(epsilon-caprolactones), poly(hydroxybutyrates), poly(anhydrides), or copolymers thereof. Derivatives and combinations also may be suitable.

The term "copolymer" as used herein is not limited to the combination of two polymers, but includes any combination of polymers, e.g., terpolymers and the like.

Other suitable acid-generating compounds include: esters including, but not limited to, ethylene glycol monoformate, ethylene glycol diformate, diethylene glycol diformate, glyceryl monoformate, glyceryl diformate, glyceryl triformate, methylene glycol diformate, and formate esters of pentaerythritol.

The pH control additive also may comprise a base to elevate the pH of the fluid.

Generally, a base may be used to elevate the pH of the mixture to greater than or equal to about 7.

Having the pH level at or above 7 may have a positive effect on a chosen breaker being used and may also inhibit the corrosion of any metals present in the wellbore or formation, such as tubing, screens, etc.

In addition, having a pH greater than 7 may also impart greater stability to the viscosity of the treatment fluid, thereby enhancing the length of time that viscosity can be maintained.

This could be beneficial in certain uses, such as in longer-term well control and in diverting.

Any known base that is compatible with the gelling agents of the present invention can be used in the fluids of the present invention.

Examples of suitable bases include, but are not limited to, sodium hydroxide, potassium carbonate, potassium hydroxide, sodium carbonate, and sodium bicarbonate.

One of ordinary skill in the art will, with the benefit of this disclosure, recognize the suitable bases that may be used to achieve a desired pH elevation.

In some embodiments, the treatment fluid may optionally comprise a further chelating agent.

When added to the treatment fluids of the present invention, the chelating agent may chelate any dissolved iron (or other divalent or trivalent cation) that may be present in the aqueous fluid and prevent any undesired reactions being caused.

Such chelating agent may e.g. prevent such ions from crosslinking the gelling agent molecules.

Such crosslinking may be problematic because, inter alia, it may cause filtration problems, injection problems, and/or again cause permeability problems.

Any suitable chelating agent may be used with the present invention.

Examples of suitable chelating agents include, but are not limited to, citric acid, nitrilotriacetic acid ("NTA"), any form of ethylene diamine tetraacetic acid ("EDTA"), hydroxyethyl ethylene diamine triacetic acid ("HEDTA"), diethylene triamine pentaacetic acid ("DTPA"), propylene diamine tetraacetic acid ("PDTA"), ethylene diamine-N,N"-di(hydroxyphenylacetic) acid ("EDDHA"), ethylene diamine-N, N"-di-(hydroxy-methylphenyl acetic acid ("EDDHMA"), ethanol diglycine ("EDG"), trans-1,2-cyclohexylene dinitrilotetraacetic acid ("CDTA"), glucoheptonic acid, gluconic acid, sodium citrate, phosphonic acid, salts thereof, and the like.

In some embodiments, the chelating agent may be a sodium or potassium salt.

Generally, the chelating agent may be present in an amount sufficient to prevent undesired side effects of divalent or trivalent cations that may be present, and thus also functions as a scale inhibitor.

One of ordinary skill in the art will, with the benefit of this disclosure, be able to determine the proper concentration of a chelating agent for a particular application.

In some embodiments, the fluids of the present invention may contain bactericides or biocides, inter alia, to protect the subterranean formation as well as the fluid from attack by bacteria. Such attacks can be problematic because they may lower the viscosity of the fluid, resulting in poorer performance, such as poorer sand suspension properties, for example.

Any bactericides known in the art are suitable. Biocides and bactericides that protect against bacteria that may attack GLDA or sulfates are preferred.

An artisan of ordinary skill will, with the benefit of this disclosure, be able to identify a suitable bactericide and the proper concentration of such bactericide for a given application.

Examples of suitable bactericides and/or biocides include, but are not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, a 2,2-dibromo-3-nitrilopropionamide, and a 2-bromo-2-nitro-1,3-propane diol. In one embodiment, the bactericides are present in the fluid in an amount in the range of from about 0.001% to about 1.0% by weight of the fluid.

Fluids of the present invention also may comprise breakers capable of reducing the viscosity of the fluid at a desired time.

Examples of such suitable breakers for fluids of the present invention include, but are not limited to, oxidizing agents such as sodium chlorites, sodium bromate, hypochlorites, perborate, persulfates, and peroxides, including organic peroxides. Other suitable breakers include, but are not limited to, suitable acids and peroxide breakers, triethanol amine, as well as enzymes that may be effective in breaking. The breakers can be used as is or encapsulated.

Examples of suitable acids may include, but are not limited to, hydrochloric acid, hydrofluoric acid, formic acid, acetic acid, citric acid, lactic acid, glycolic acid, etc.

A breaker may be included in a treatment fluid of the present invention in an amount and form sufficient to achieve the desired viscosity reduction at a desired time.

The breaker may be formulated to provide a delayed break, if desired.

The fluids of the present invention also may comprise suitable fluid loss additives.

Such fluid loss additives may be particularly useful when a fluid of the present invention is used in a fracturing application or in a fluid used to seal a formation against invasion of fluid from the wellbore.

Any fluid loss agent that is compatible with the fluids of the present invention is suitable for use in the present invention.

Examples include, but are not limited to, starches, silica flour, gas bubbles (energized fluid or foam), benzoic acid, soaps, resin particulates, relative permeability modifiers, degradable gel particulates, diesel or other hydrocarbons dispersed in fluid, and other immiscible fluids.

Another example of a suitable fluid loss additive is one that comprises a degradable material.

Suitable examples of degradable materials include polysaccharides such as dextran or cellulose; chitins; chitosans; proteins; aliphatic polyesters; poly(lactides); poly(glycolides); poly(glycolide-co-lactides); poly(epsilon-caprolactones); poly(3-hydroxybutyrates); poly(3-hydroxybutyrate-co-hydroxyvalerates); poly(anhydrides); aliphatic poly(carbonates); poly(ortho esters); poly(amino acids); poly(ethylene oxides); poly(phosphazenes); derivatives thereof; or combinations thereof.

In some embodiments, a fluid loss additive may be included in an amount of about 5 to about 2,000 lbs/Mgal (about 600 to about 240,000 g/Mliter) of the fluid.

In some embodiments, the fluid loss additive may be included in an amount from about 10 to about 50 lbs/Mgal (about 1,200 to about 6,000 g/Mliter) of the fluid.

In certain embodiments, a stabilizer may optionally be included in the fluids of the present invention.

It may be particularly advantageous to include a stabilizer if a chosen fluid is experiencing viscosity degradation.

One example of a situation where a stabilizer might be beneficial is where the BHT (bottom hole temperature) of the wellbore is sufficient to break the fluid by itself without the use of a breaker.

Suitable stabilizers include, but are not limited to, sodium thiosulfate, methanol, and salts such as formate salts and potassium or sodium chloride.

Such stabilizers may be useful when the fluids of the present invention are utilized in a subterranean formation having a temperature above about 200° F. (about 93° C.). If included, a stabilizer may be added in an amount of from about 1 to about 50 lbs/Mgal (about 120 to about 6,000 g/Mliter) of fluid.

Scale inhibitors may be added to the fluids of the present invention, for example, when such fluids are not particularly compatible with the formation waters in the formation in which they are used.

These scale inhibitors may include water-soluble organic molecules with carboxylic acid, aspartic acid, maleic acids, sulfonic acids, phosphonic acid, and phosphate ester groups including copolymers, ter-polymers, grafted copolymers, and derivatives thereof.

Examples of such compounds include aliphatic phosphonic acids such as diethylene triamine penta(methylene phosphonate) and polymeric species such as polyvinyl sulfonate.

The scale inhibitor may be in the form of the free acid but is preferably in the form of mono- and polyvalent cation salts such as Na, K, Al, Fe, Ca, Mg, $NH_4$. Any scale inhibitor that is compatible with the fluid in which it will be used is suitable for use in the present invention.

Suitable amounts of scale inhibitors that may be included in the fluids of the present invention may range from about 0.05 to 100 gallons per about 1,000 gallons (i.e. 0.05 to 100 liters per 1,000 liters) of the fluid.

Any particulates such as proppant, gravel, that are commonly used in subterranean operations in sandstone formations may be used in the present invention (e.g., sand, gravel, bauxite, ceramic materials, glass materials, wood, plant and vegetable matter, nut hulls, walnut hulls, cotton seed hulls, cement, fly ash, fibrous materials, composite particulates, hollow spheres and/or porous proppant).

It should be understood that the term "particulate" as used in this disclosure includes all known shapes of materials including substantially spherical materials, oblong, fibre-like, ellipsoid, rod-like, polygonal materials (such as cubic materials), mixtures thereof, derivatives thereof, and the like.

In some embodiments, coated particulates may be suitable for use in the treatment fluids of the present invention. It should be noted that many particulates also act as diverting agents. Further diverting agents are viscoelastic surfactants and in-situ gelled fluids.

Oxygen scavengers may be needed to enhance the thermal stability of the GLDA. Examples thereof are sulfites and ethorbates.

Friction reducers can be added in an amount of up to 0.2 vol %. Suitable examples are viscoelastic surfactants and enlarged molecular weight polymers.

Crosslinkers can be chosen from the group of multivalent cations that can crosslink polymers such as Al, Fe, B, Ti, Cr, and Zr, or organic crosslinkers such as polyethylene amides, formaldehyde.

Sulfide scavengers can suitably be an aldehyde or ketone.

Viscoelastic surfactants can be chosen from the group of amine oxides or carboxyl butane based surfactants.

High temperature applications may benefit from the presence of an oxygen scavenger in an amount of less than about 2 volume percent of the solution.

At the same time the fluids can be used at an increased pressure. Often fluids are pumped into the formation under pressure. Preferably, the pressure used is below fracture pressure, i.e. the pressure at which a specific formation is susceptible to fracture. Fracture pressure can vary a lot depending on the formation treated, but is well known by the person skilled in the art.

In the process of the invention the fluid can be flooded back from the formation. Even more preferably, (part of) the solution is recycled.

It must be realized, however, that GLDA, being a biodegradable chelating agent, will not completely flow back and therefore is not recyclable to the full extent.

The invention is further illustrated by the Examples below.

EXAMPLES

General Procedure for Core Flooding Experiments

FIG. 1 shows a schematic diagram for the core flooding apparatus. For each core flooding test a new piece of core with a diameter of 1.5 inches and a length of 6 or 20 inches was used. The cores were placed in the coreholder and shrinkable seals were used to prevent any leakage between the holder and the core.

An Enerpac hand hydraulic pump was used to pump the brine or test fluid through the core and to apply the required overburden pressure. The temperature of the preheated test fluids was controlled by a compact bench top CSC32 series, with a 0.1° resolution and an accuracy of ±0.25% full scale ±1° C. It uses a type K thermocouple and two Outputs (5 A 120 Vac SSR). A back pressure of 1,000 psi was applied to keep $CO_2$ in solution.

The back pressure was controled by a Mity-Mite back pressure regulator model S91-W and kept constant at 300-400 psi less than the overburden pressure. The pressure drop across the core was measured with a set of FOXBORO differential pressure transducers, models IDP10-A26E21F-M1, and monitored by lab view software. There were two gauges installed with ranges of 0-300 psi, and 0-1500 psi, respectively.

Before running a core flooding test with sandstone or carbonate, the core was first dried in an oven at 300° F. or 250° F. and weighted. Subsequently, the sandstone core was saturated with 5 wt % NaCl brine at a 2,000 psi overburden pressure and 1,000 psi back pressure, whereas the carbonate core was saturated with water at a 1,500 psi overburden pressure and a 500 psi back pressure. The pore volume was calculated from the difference in weight of the dried and saturated core divided by the brine density.

The core permeability before and after the treatment was calculated from the pressure drop using Darcy's equation for laminar, linear, and steady-state flow of Newtonian fluids in porous media:

$$K = (122.81 q\mu L)/(\Delta p D^2)$$

where K is the core permeability, md, q is the flow rate, cm³/min, μ is the fluid viscosity, cP, L is the core length, in., Δp is the pressure drop across the core, psi, and D is the core diameter, in.

Prior to the core flooding tests the cores were pre-heated to the required test temperature for at least 3 hours.

In the Examples solutions of 15 wt % HCl and of HEDTA, MGDA, and GLDA (all 0.6 M and having a pH of 4) were investigated on Berea, Bandera, Kentucky, and Scioto sandstone cores to determine the functionality of those chelating agents with the sandstone cores at 300° F. (about 149° C.) and 5 cm³/min. HEDTA and GLDA were obtained from AkzoNobel Functional Chemicals BV. MGDA was obtained from BASF Corporation.

Below Table 1 indicates the mineral composition of the sandstone formations.

TABLE 1

Mineral Composition For Different Sandstone Cores

| Mineral | Berea | Bandera | Kentucky | Scioto |
|---|---|---|---|---|
| Quartz | 87 | 57 | 66 | 70 |
| Dolomite | 1 | 16 | — | — |
| Calcite | 2 | — | — | — |
| Feldspar | 3 | — | 2 | 2 |
| Kaolinite | 5 | 3 | Trace | Trace |
| Illite | 1 | 10 | 14 | 18 |
| Chlorite | 1 | 1 | — | 4 |
| Plagioclase | — | 12 | 17 | 5 |

Example 1

Stimulating Berea Sandstone with HCl, GLDA, MGDA, and HEDTA Solutions

FIG. 2 shows the normalized pressure drop across the core for 0.6M HEDTA (pH=4), 0.6M MGDA (pH=4), and 0.6M GLDA (pH=4) at 300° F. (about 149° C.) and 5 cm³/min using Berea sandstone cores. HEDTA and GLDA have almost the same trend. After injecting 2 PV (pore volume), GLDA was more compatible than HEDTA (it is suspected that there was some fines migration in this phase using HEDTA), and after injecting 5 PV, the normalized pressure drop was the same for the two chelating agents. MGDA shows different behaviour. No pressure increase was observed, indicating that the viscosity did not increase due to the dissolution of rock components and that there was no interaction with the illite. Based on these results it can be concluded that HEDTA, MGDA, and GLDA at pH 4 are all compatible with the Berea sandstone core.

FIG. 3 shows the permeability ratio (final core permeability/initial core permeability) for 15 wt % HCl, for 0.6M HEDTA, 0.6M MGDA, and 0.6M GLDA at pH 4 in Berea sandstone. The permeability ratio was 1.74 for GLDA, 1.24 for HEDTA, and 0.9 for HCl and MGDA, showing the improved ability of GLDA over HEDTA, MGDA, and HCl in stimulating Berea sandstone cores at low pH.

Example 2

Stimulating Bandera Sandstone Cores with HCl, HEDTA, MGDA, and GLDA Solutions

FIG. 4 shows the permeability ratio (final core permeability/initial core permeability) for 15 wt % HCl, and for 0.6M HEDTA, 0.6M MGDA, and 0.6M GLDA at pH 4 in Bandera sandstone. The permeability ratio was 1.96 for GLDA, 1.17 for HEDTA, 1.0 for MGDA, and only 0.18 for HCl. GLDA clearly dissolved more calcium than HEDTA or MGDA at pH 4 and the Bandera core permeability was improved more than with HEDTA or MGDA. HCl was clearly found to cause damage to the Bandera sandstone core due to the clay appearing unstable in HCl at the reaction conditions.

GLDA at low pH value (4) thus performed better than HEDTA or MGDA in both Berea and Bandera sandstone cores at 300° F. (about 149° C.). GLDA at pH 4 improved the core permeability 1.4 times more than HEDTA did with Berea sandstone cores, and 1.7 times more in the case of Bandera sandstone cores. MGDA caused formation damage in Berea sandstone and neither improved nor damaged the Bandera sandstone, which indicates that GLDA is a more suitable chelating agent for stimulating sandstone cores than HEDTA or MGDA. The permeability results found for HCl were even worse than those for HEDTA or MGDA. It was concluded that in sandstone cores GLDA performs much better than HCl and also better than HEDTA or MGDA.

Example 3

Stimulating Sandstone Cores with Increasing Illite Content with GLDA Solutions

FIG. 5 shows the permeability ratio (final core permeability/initial core permeability) of 0.6M GLDA at pH 4 in sandstones with increasing illite content. The permeability ratios for all four sandstone cores are between 1.60 and 1.96, even when the illite content is 18% as for Kentucky sandstone. This consistent increase in permeability clearly shows that GLDA is extremely compatible with illite and the results seem to only depend on the amount of GLDA soluble material in the sandstone.

Example 4

Example 2 was repeated with new Bandera sandstone cores derived from a different source rock. Since the rock is a natural material, the composition differs from the Bandera cores tested before, i.e. the amount of GLDA-soluble material is somewhat higher for the Bandera sandstone tested in Examples 2 and 3. As a result the absolute numbers for the permeability ratio differ from those for the Examples shown before. The results are represented in FIG. 6 and clearly show that GLDA significantly improves the permeability of the Bandera sandstone under a wide range of temperature and pH conditions. The best results were obtained at low pH, i.e. pH=4.

Example 5

Example 2 is repeated with illite-containing carbonate cores and fluids that in addition to 0.6 M GLDA at pH=4 also contain a cationic surfactant (0.2 vol % Arquad C-35) and fluids that in addition to 0.6 M GLDA at pH=4 also contain both a cationic surfactant (0.2 vol % Arquad C-35) and a corrosion inhibitor (0.1 vol % Armohib 31). The cationic surfactant, Arquad C-35, consists of 35% coco trimethyl ammonium chloride and water. Armohib 31 represents a group of widely used corrosion inhibitors for the oil and gas industry and consists of alkoxylated fatty amine salts, alkoxylated organic acid, and N,N'-dibutyl thiourea. The corrosion inhibitor and cationic surfactant are available from AkzoNobel Surface Chemistry. The permeability of the carbonate core shows an improvement after treating the core with GLDA and the cationic surfactant when compared to GLDA alone. The permeability ratio is even higher after treatment with a combination of GLDA plus cationic surfactant and corrosion inhibitor, showing a synergistic effect for combining these three components. In conclusion, combining GLDA plus cationic surfactant and corrosion inhibitor gives the best result in permeability and therefore production of the oil or gas well, while it simultaneously protects the equipment against corrosion even under downhole conditions of high temperature and pressure.

The invention claimed is:

1. A process for treating a formation containing illite, the process comprising introducing an acidic fluid comprising glutamic acid N,N-diacetic acid or a salt thereof (GLDA) into the formation and treating the formation with the acidic fluid, the fluid leaving the illite in the formation substantially unaffected.

2. The process of claim 1, wherein the formation is an illite-containing sandstone formation.

3. The process of claim 1, wherein the acidic fluid contains between 5 and 30 wt % of GLDA on the basis of the total weight of the fluid.

4. The process of claim 1, wherein the pH of the acidic fluid is at least 3.5.

5. The process of claim 1, wherein the temperature is between 77 and 400° F. (about 25 and 149° C.).

6. The process of claim 1, wherein the acidic fluid comprises water as a solvent.

7. The process of claim 1, wherein the acidic fluid further comprises an additive selected from the group consisting of anti-sludge agents, surfactants, corrosion inhibitors, mutual solvents, corrosion inhibitor intensifiers, foaming agents, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives, bactericides/biocides, particulates, crosslinkers, salt substitutes, relative permeability modifiers, sulfide scavengers, fibres, nanoparticles, and consolidating agents.

8. The process of claim 7, wherein the surfactant is a nonionic or anionic surfactant and the formation is an illite-containing sandstone formation.

9. The process of claim 7, wherein the surfactant is a nonionic or cationic surfactant and the formation is an illite-containing carbonate formation.

10. The process of claim 7, wherein the surfactant is present in an amount of 0.1 to 2 volume % on acidic total fluid.

11. The process of claim 7, wherein the corrosion inhibitor is present in an amount of 0.1 to 2 volume % on total acidic fluid.

12. The process of claim 7, wherein the mutual solvent is present in an amount of 1 to 50 wt % on total acidic fluid.

13. The process of claim 1 including the step of identifying the presence of illite in the formation.

14. The process of claim 1 wherein said acidic fluid acts upon the illite-containing formation whereby is achieved at least one of (i) an increased permeability, (ii) the removal of small particles, and (iii) the removal of inorganic scale.

15. The process of claim 1 wherein the formation includes some calcium carbonate material and the fluid dissolves at least a portion of the calcium carbonate material in the formation.

* * * * *